US007797001B2

(12) United States Patent (10) Patent No.: US 7,797,001 B2
Seligmann (45) Date of Patent: Sep. 14, 2010

(54) LOCATION-BASED COMMAND EXECUTION FOR MOBILE TELECOMMUNICATIONS TERMINALS

(75) Inventor: Doree Duncan Seligmann, New York, NY (US)

(73) Assignee: Avaya Inc., Basking Ridge, NJ (US)

( * ) Notice: Subject to any disclaimer, the term of this patent is extended or adjusted under 35 U.S.C. 154(b) by 134 days.

(21) Appl. No.: 10/816,511

(22) Filed: Apr. 1, 2004

(65) Prior Publication Data

US 2005/0239481 A1 Oct. 27, 2005

(51) Int. Cl.
*H04W 24/00* (2009.01)
(52) U.S. Cl. .................. 455/456.3; 455/414.3; 455/419; 455/456.2; 709/206
(58) Field of Classification Search ...... 455/456.1–457, 455/466, 414.1–414.3, 418–420, 41.1–41.2, 455/566; 709/203–206; 705/1, 10
See application file for complete search history.

(56) References Cited

U.S. PATENT DOCUMENTS

| 5,778,304 | A | * | 7/1998 | Grube et al. ............. 455/456.4 |
| 5,903,653 | A | * | 5/1999 | Ross et al. .................. 380/271 |
| 5,948,040 | A | * | 9/1999 | DeLorme et al. ............ 701/201 |
| 5,963,861 | A | * | 10/1999 | Hanson .................... 455/456.1 |
| 6,014,090 | A | * | 1/2000 | Rosen et al. ................ 340/905 |
| 6,091,956 | A | * | 7/2000 | Hollenberg .............. 455/456.5 |
| 6,115,611 | A | * | 9/2000 | Kimoto et al. ........... 455/456.3 |
| 6,209,034 | B1 | * | 3/2001 | Gladwin et al. ............. 709/227 |
| 6,233,448 | B1 | * | 5/2001 | Alperovich et al. ......... 455/417 |
| 6,381,465 | B1 | * | 4/2002 | Chern et al. ................ 455/466 |
| 6,389,288 | B1 | * | 5/2002 | Kuwahara et al. ........ 455/456.6 |
| 6,405,033 | B1 | * | 6/2002 | Kennedy et al. ......... 455/414.1 |
| 6,580,914 | B1 | * | 6/2003 | Smith ....................... 455/456.6 |
| 6,618,593 | B1 | * | 9/2003 | Drutman et al. .......... 455/456.3 |
| 6,647,269 | B2 | * | 11/2003 | Hendrey et al. .......... 455/456.3 |
| 6,650,902 | B1 | * | 11/2003 | Richton .................... 455/456.3 |
| 6,694,143 | B1 | * | 2/2004 | Beamish et al. .......... 455/456.1 |
| 6,731,940 | B1 | * | 5/2004 | Nagendran ............... 455/456.1 |
| 6,748,195 | B1 | * | 6/2004 | Phillips ...................... 455/41.2 |
| 6,757,544 | B2 | * | 6/2004 | Rangarajan et al. ...... 455/456.1 |
| 6,772,213 | B2 | * | 8/2004 | Glorikian .................... 709/228 |
| 6,801,763 | B2 | * | 10/2004 | Elsey et al. ............... 455/404.1 |
| 6,834,195 | B2 | * | 12/2004 | Brandenberg et al. .... 455/456.3 |
| 6,836,667 | B1 | * | 12/2004 | Smith, Jr. .................. 455/456.1 |
| 6,983,139 | B2 | * | 1/2006 | Dowling et al. .......... 455/414.2 |
| 7,069,027 | B2 | * | 6/2006 | Miriyala ................... 455/456.4 |
| 7,072,672 | B1 | * | 7/2006 | Vanska et al. ............. 455/456.3 |
| 7,526,539 | B1 | * | 4/2009 | Hsu ........................... 709/223 |
| 7,574,238 | B2 | * | 8/2009 | Otaka et al. ................. 455/566 |
| 7,664,509 | B2 | * | 2/2010 | Zellner et al. ............ 455/456.1 |
| 2001/0004589 | A1 | * | 6/2001 | Massy et al. ................ 455/414 |
| 2002/0119788 | A1 | * | 8/2002 | Parupudi et al. ............. 455/456 |
| 2002/0173317 | A1 | * | 11/2002 | Nykanen et al. ............. 455/456 |

(Continued)

*Primary Examiner*—Sharad Rampuria
(74) *Attorney, Agent, or Firm*—DeMont & Breyer, LLC

(57) ABSTRACT

Methods and apparatuses for responding to a command at a mobile telecommunications terminal based on the geo-location of the terminal are disclosed. The illustrative embodiment determines the appropriate response based on geo-location and optionally, one or more additional factors (e.g., who the user is, the nature of the command, what the data is when the command is a query, the date and time [i.e., "calendrical time"], etc.). Responses based on the geo-location of the terminal (and inferentially, the user) might be desirable in a variety of settings, such as hospitals, banks, military bases, libraries, museums, etc.

32 Claims, 11 Drawing Sheets

U.S. PATENT DOCUMENTS

| | | |
|---|---|---|
| 2002/0177449 A1* | 11/2002 | McDonnell et al. ......... 455/456 |
| 2003/0060211 A1* | 3/2003 | Chern et al. ................. 455/456 |
| 2004/0024700 A1* | 2/2004 | Petigny ....................... 705/39 |
| 2004/0043758 A1* | 3/2004 | Sorvari et al. ............. 455/414.1 |
| 2005/0159173 A1* | 7/2005 | Dowling .................. 455/456.3 |
| 2005/0192028 A1* | 9/2005 | Gorsuch ................... 455/456.3 |
| 2006/0014532 A1* | 1/2006 | Seligmann et al. .......... 455/420 |
| 2008/0064383 A1* | 3/2008 | Nath et al. .................. 455/418 |
| 2008/0244467 A1* | 10/2008 | Kim et al. ................... 715/863 |
| 2008/0261626 A1* | 10/2008 | Farazmandnia .......... 455/456.5 |
| 2009/0197620 A1* | 8/2009 | Choi et al. ................ 455/456.3 |
| 2009/0227293 A1* | 9/2009 | Yulo .......................... 455/566 |
| 2009/0278828 A1* | 11/2009 | Fletcher et al. ............. 345/207 |
| 2009/0280792 A1* | 11/2009 | Leblanc et al. .............. 455/418 |
| 2010/0056128 A1* | 3/2010 | Hwang et al. ............... 455/418 |
| 2010/0062810 A1* | 3/2010 | Griffin ....................... 455/566 |
| 2010/0087179 A1* | 4/2010 | Makavy et al. .............. 455/418 |

* cited by examiner

| USER | COMMAND | PERIMETER | INSIDE | OUTSIDE |
|---|---|---|---|---|
| grchen | read pulse | floor1 | Y | N |
| grchen | store pulse | room123 | Y / encode pulse | N |
| tbsmith | bill customer | bldg | Y / suppress balance | N |
| jdwilson | read bloodtest | room123 | rule1 | yes |
| ⋮ | ⋮ | ⋮ | ⋮ | ⋮ |
| nclinton | read bloodtest | bldg | yes | rule2 / encode LDL |

402

| USER | CONTENT | PERIMETER | INSIDE | OUTSIDE |
|---|---|---|---|---|
| majjsmith | F16MaxSpeed | fortMonmouth | secret | unclassified |
| majjsmith | TomMaxRange | closedArea35 | secret | unclassified |
| ⋮ | ⋮ | ⋮ | ⋮ | ⋮ |
| captCrunch | videoClip12 | bldg35 | rule$n$ | unclassified |

403

| RULE NAME | RULE |
|---|---|
| rule1 | only if *HIV_positive* = false |
| rule2 | only if *privacy_waiver* = true |
| ⋮ | ⋮ |
| rule$n$ | only mon-fri 8:00am - 6:00pm |

404

| PERIMETER | SHAPE | PARAMETERS |
|---|---|---|
| fortMonmouth | polygon | {(0,0), (2,5), ... } |
| room123 | polygon | {(10,21), (10,36), ... } |
| ⋮ | ⋮ | ⋮ |
| perim5 | circle | (0,0), 7.5 |

…

LOCATION-BASED COMMAND EXECUTION FOR MOBILE TELECOMMUNICATIONS TERMINALS

FIELD OF THE INVENTION

The present invention relates to telecommunications in general, and, more particularly, to techniques for intelligently responding to a command issued by the user of a mobile telecommunications terminal.

BACKGROUND OF THE INVENTION

FIG. 1 depicts user 101 who is carrying mobile telecommunications terminal 102 (e.g., a mobile telephone, a personal digital assistant [PDA], etc.) in accordance with the prior art. Mobile telecommunications terminal 102 wirelessly transmits signals to and receives signals from one or more wireless infrastructure nodes (e.g., a Code Division Multiple Access [CDMA] base station, an Institute of Electrical and Electronics Engineers [IEEE] 802.11 wireless access point, etc.). User 101 can move about and can enter commands-into mobile telecommunications terminal 102 via one or more input mechanisms (e.g., keypad input, pen-based input, voice input, etc.). Mobile telecommunications terminal 102 also typically has one or more output transducers (e.g., liquid-crystal display, speaker, etc.) to present content (e.g., a web page, an audio clip, output of an executed query, etc.) to user 101.

A local command issued by user 101 is a command that executes on mobile telecommunications terminal 102 and does not involve communication with any remote device. Examples of local commands include adjusting the volume of the speaker of mobile telecommunications terminal 102, editing information in a spreadsheet stored in disk memory in mobile telecommunications terminal 102, playing a Chess game residing in random-access memory in mobile telecommunications terminal 102, playing a sound clip stored on disk in mobile telecommunications terminal 102, capturing an image with a digital camera embedded in mobile telecommunications terminal 102, and capturing an acoustic signal with a microphone embedded in mobile telecommunications terminal 102. Local commands that involve accessing content stored at mobile telecommunications terminal 102 (e.g., in random-access memory, in disk storage, etc.) are also known as requests to access local content.

A remote command issued by user 101 is a command issued through mobile telecommunications terminal 102 that (i) executes on a remote device (e.g., a server, a mobile telecommunications terminal other than terminal 102, etc.), (ii) accesses data stored at a remote device, (iii) transmits data to a remote device, or (iv) any combination of (i), (ii), and (iii). Examples of remote commands include downloading a web page, issuing a query that searches a database that is stored on another device, sending an email message, and placing a telephone call. Remote commands that satisfy condition (ii) (i.e., that access information stored at a remote device) are also known as requests to access remote content.

Some computing devices such as mobile telecommunications terminals, desktop personal computers (PCs), and servers require a user to log in to the device before allowing the user to use the device. For example, when a PC running the Linux or Windows XP operating system is powered on, the user is confronted with a log-in screen that asks for the user's username (also referred to as a screen name for Internet service providers such as AOL) and password. The user is not allowed to proceed past the start-up screen until he or she provides a valid username and password combination.

Some computing devices provide, in addition to a log-in screen, one or more authorization mechanisms to restrict access to data, commands, or both. For example, PCs that run the Linux or Windows XP operating system enable a data file to be associated with a particular user or group of users, thereby allowing only the associated user(s) to access the data file. In some authorization mechanisms, separate read- and write-permissions can be associated with a data file, thereby partitioning users into four categories: (i) those who can read and write to the data file, (ii) those who can read the data file but cannot write to it, (iii) those who can write to the data file but cannot read it, and (iv) those who can neither read nor write to the data file. Furthermore, some authorization mechanisms enable a command (such as an executable file) to be associated with a particular user or group of users, thereby allowing only the associated user(s) to execute the command.

SUMMARY OF THE INVENTION

The present invention enables the response to a command from a mobile telecommunications terminal to be at least partially based on the geo-location of the mobile telecommunications terminal when the command is issued. In some embodiments of the present invention, the response to the command is also at least partially based on one or more additional factors (e.g., who the user is, the nature of the command, what the data is when the command is a query, the date and time [i.e., "calendrical time"], etc.). There are many situations in which this might be desirable.

For example, FIG. 2 depicts a map of a portion of a floor in a hospital. Perimeter 203-1 represents the walls of the floor and perimeters 203-2 through 203-5 represent four of the rooms on the floor. FIG. 2 also depicts user 101, a nurse who is carrying mobile telecommunications terminal 202 and who is inside room 203-2. Not shown in FIG. 2 are the patients, beds, and medical equipment occupying rooms 203-2 through 203-5.

In some cases, it might be desirable to restrict wireless access to a patient's records when the mobile terminal is inside that patient's room. As another example, it might be desirable to allow a nurse to access only the records of patients assigned to him or her, in addition to the requirement that the nurse must be inside in the patient's room. It might also be desirable, for example, to allow (i) a nurse practitioner to access a patient's records from anywhere inside the hospital, but not outside the hospital, and (ii) a doctor to access a patient's records from any location (i.e., from both inside and outside the hospital). As yet another example, it might be desirable to allow a doctor to store certain patient information (e.g., blood pressure, pulse, etc.) via his or her mobile terminal only when the doctor is inside the patient's hospital room.

Other locales at which the present invention might be desirable are libraries, military bases, banks, and museums. For example, it might be desirable to prevent people from placing a telephone call via their mobile telecommunications terminals while inside the library, except perhaps for one or more of the library staff. Similarly, a user accessing content (e.g., a news article, a web page, etc.) via his or her mobile terminal might automatically receive such content as synthesized speech except inside a library, where the content will be displayed as text.

As another example, some military data (e.g., maximum speed of a Tomahawk missile, maximum range of a Harpoon missile, etc.) have both classified and unclassified versions. When a user issues a request to access such a datum via his or her mobile terminal, therefore, it might be desirable to automatically return the classified version when inside the military base, and the unclassified version when outside the military base. Similarly, a user on the military base might be able to access a particular classified datum only when inside one of a plurality of "closed areas" on the base. As another example, a user might be able to access data stored on a server that resides in a particular closed area only when the user is physically inside that closed area.

At a bank, it might be desirable to allow an employee of the bank to access, via his or her mobile terminal, a depositor's social security number only (i) when the employee is inside the bank, and (ii) during banking hours (e.g., 9:00 am to 3:00 pm during non-holiday weekdays, etc.). An employee might be allowed, however, to access a depositor's address from both inside and outside the bank at any date and time. Similarly, a bank employee might be able to access a depositor's balance from any location inside the bank when the balance is less than $1 million, but might only be able to access the depositor's balance inside a particular room reserved for "high net-worth client transactions" when the balance exceeds $1 million. As another example, when a teller deposits a check into a depositor's account, it might be desirable to display the new balance only when it is less than $1 million, and instead display "Deposit confirmed" when the balance exceeds $1 million in order to protect the privacy of the depositor. Alternatively, instead of the "Deposit confirmed" message, an encoded version of the balance might be displayed, where the branch president knows the code, but the tellers do not, thus allowing the branch president and teller to enter a transaction together at a desktop PC and allowing only the branch president to know the balance of a high net-worth depositor.

At a museum, it might be desirable to prevent people who have terminals that ,include a digital camera (e.g., a "camera-phone", etc.) from taking any pictures, except perhaps in the museum cafeteria.

In the illustrative embodiment of the present invention, a mobile telecommunications terminal, upon receiving a remote command from the terminal's user, transmits the remote command to a server of the appropriate wireless infrastructure (e.g., a server connected to a CDMA base station, a server connected to an IEEE 802.11 wireless access point, etc.), and the server determines whether to execute the remote command based on the geo-location of the mobile telecommunications terminal, and optionally, on one or more additional factors, including: the identity of the user, the nature of the command (e.g., a query, a command to store data, a command to place a call, a command to transmit data, etc.), one or more arguments of a command (e.g., a filename, a command option, etc.), the value of a datum retrieved by a query, the geo-location at which a datum is stored, and calendrical time. If the server decides not to execute the remote command, it transmits a message (e.g., a text string, synthesized speech, etc.) to the mobile telecommunications terminal that indicates that the remote command was refused. If the server does execute the remote command, then, if there are any products (e.g., a result value, etc.) of the command, the server determines, based on the geo-location and optionally one or more additional factors as described above, whether to suppress or encode one or more of these products. The server then transmits any unsuppressed products (both unchanged and encoded) to the mobile telecommunications terminal.

When a user issues a local command at a mobile telecommunications terminal in accordance with the illustrative embodiment, the terminal determines whether to execute the local command based on its geo-location, and optionally on one or more additional factors, as described above. If the mobile telecommunications terminal decides not to execute the local command, it outputs a message that indicates that the command was refused. If the mobile telecommunications terminal does execute the local command, then, if the command has any products, the terminal determines, based on the geo-location and optionally one or more additional factors as described above, whether to suppress or encode one or more of these products. The mobile telecommunications terminal then emits (e.g., visually displays, acoustically plays, etc.) any unsuppressed products (both unchanged and encoded) accordingly.

For the purposes of this specification, the term "calendrical time" is defined as indicative of one or more of the following:
(i) a time (e.g., 16:23:58, etc.),
(ii) one or more temporal designations (e.g., Tuesday, Novemeber, etc.),
(iii) one or more events (e.g., Thanksgiving, John's birthday, etc.), and
(iv) a time span (e.g., 8:00-9:00, etc.).

For the purposes of this specification, the term "local command" is defined as a command issued by the user of a mobile telecommunications terminal that is executed at the terminal and does not involve communication with any remote device.

For the purposes of this specification, the term "request to access local content" is a local command issued by the user of a mobile telecommunications terminal that accesses only content stored at the mobile telecommunications terminal.

For the purposes of this specification, the term "remote command" is defined as a command issued by the user of a mobile telecommunications terminal that (i) executes on a remote device (e.g., a server, another mobile telecommunications terminal, etc.), (ii) accesses data stored at a remote device, (iii) transmits data to a remote device, or (iv) any combination of (i)-(iii).

For the purposes of this specification, the term "request to access remote content" is a remote command that satisfies condition (ii) (i.e., that accesses content stored at a remote device).

In this specification, the term "command," without a modifier, might be used when context renders the issue of local versus remote unambiguous. For example, "transmitting a command from a mobile telecommunications terminal to a server" refers to a remote command, and "receiving a command at a terminal and executing the command at the terminal" refers to a local command.

As in the case of "command," in this specification the term "request to access content," without a modifier, might be used when context renders the issue of local versus remote unambiguous. For example, "transmitting a request to access content from a mobile telecommunications terminal to a server" refers to a request to access remote content, and "receiving a request to access content at a terminal and accessing the content at that terminal" refers to a request to access local content.

The illustrative embodiment comprises: (a) receiving (i) a command from a mobile telecommunications terminal, and (ii) the geo-location of the mobile telecommunications terminal; and (b) determining whether to execute the command based on the geo-location of the mobile telecommunications terminal.

BRIEF DESCRIPTION OF THE DRAWINGS

FIG. 4 depicts an exemplary organization of information in database 305, as shown in FIG. 3, in accordance with the illustrative embodiment of the present invention.

DETAILED DESCRIPTION

Figure 1:
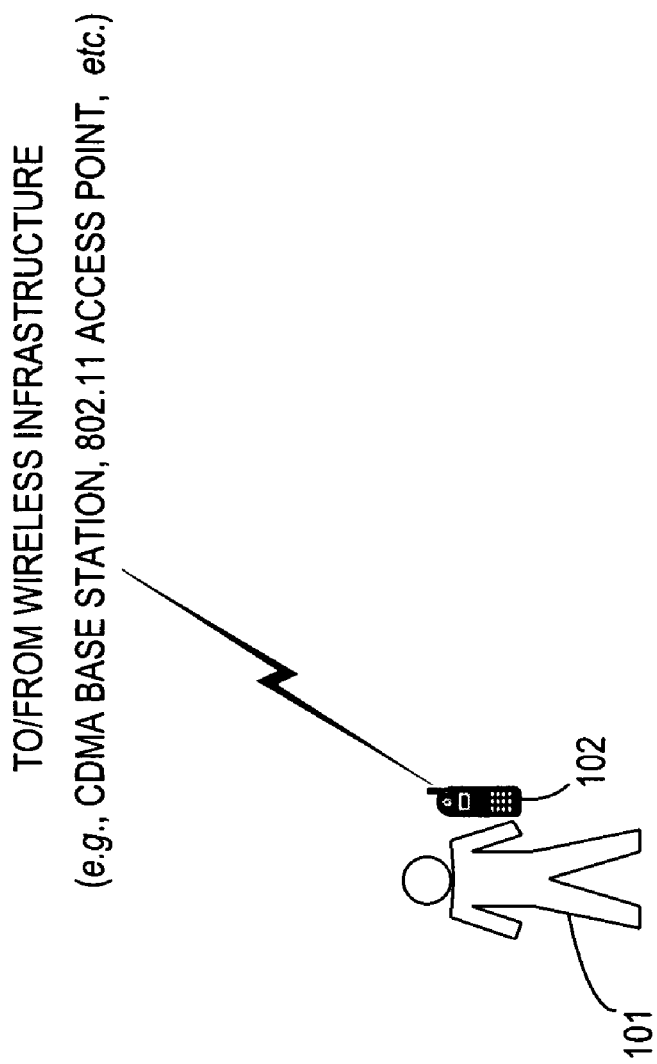
FIG. 1 depicts a user carrying a mobile telecommunications terminal in the prior art.
Figure 2:
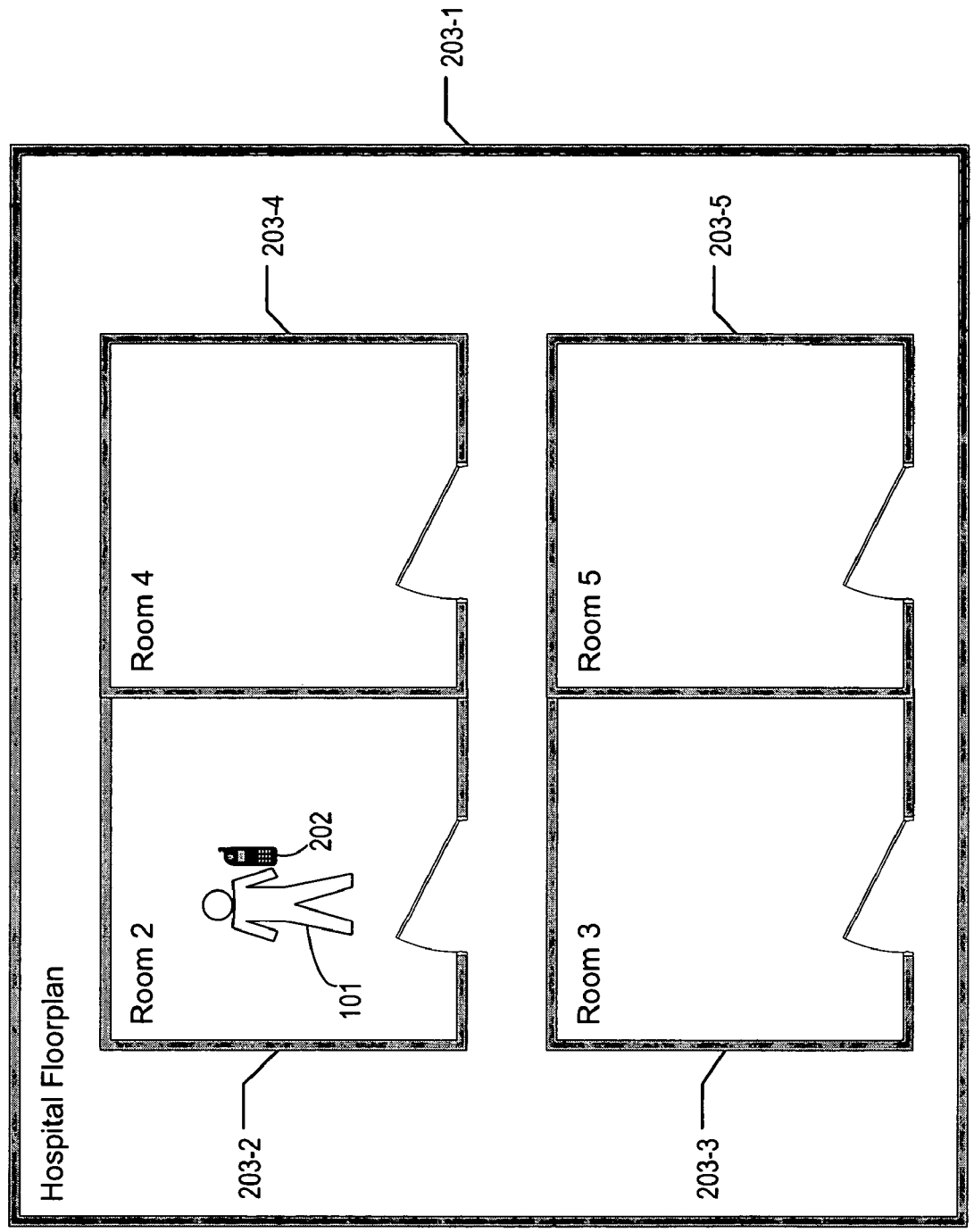
FIG. 2 depicts a user carrying a mobile telecommunications terminal in a hospital, in accordance with the illustrative embodiment of the present invention.
Figure 3:
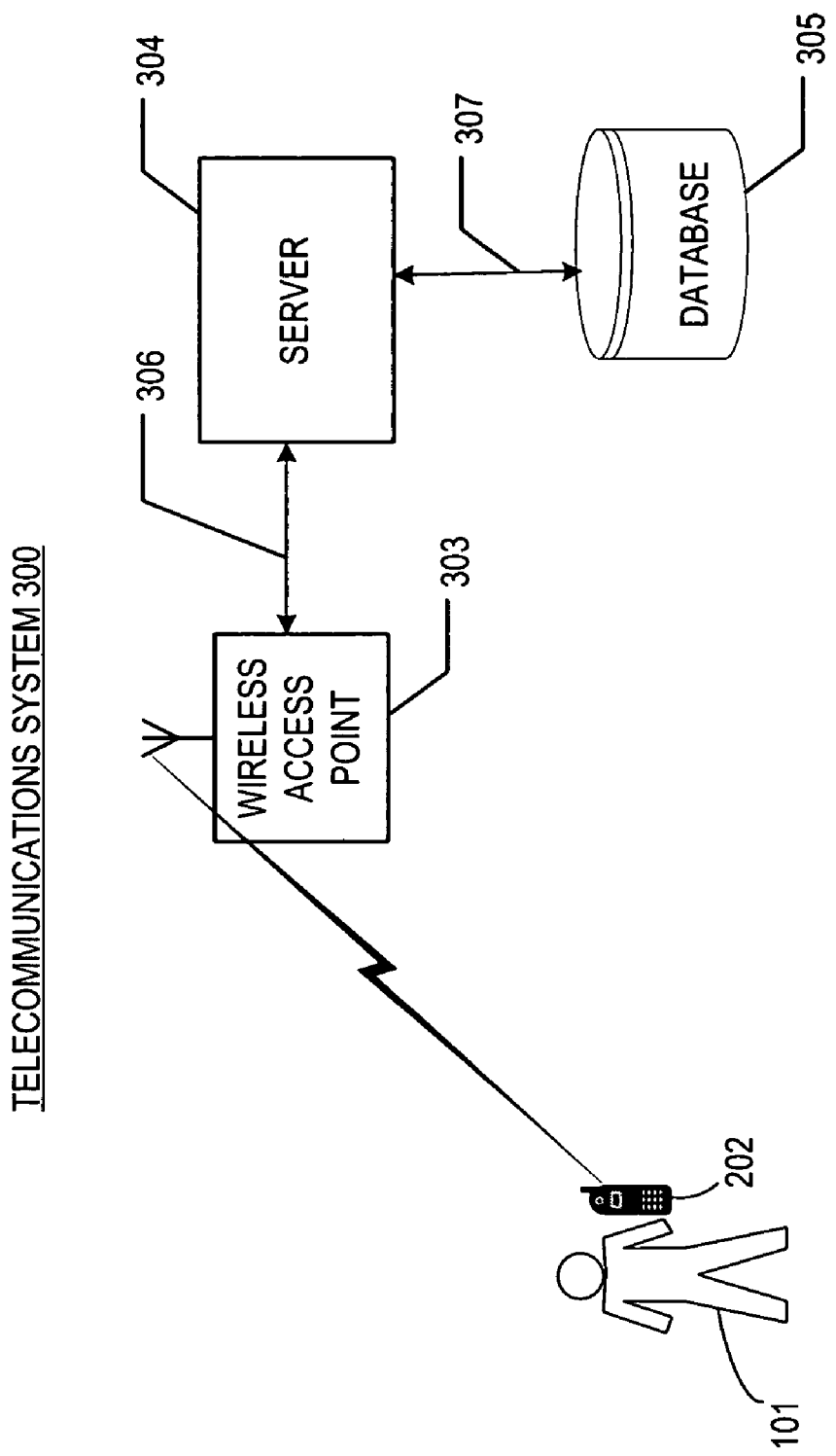
FIG. 3 depicts the salient components of telecommunications system 300, in accordance with the illustrative embodiment of the present invention.

FIG. 3 depicts the salient components of telecommunications system 300 in accordance with the illustrative embodiment of the present invention. As shown in FIG. 3, telecommunications system 300 comprises mobile telecommunications terminal 202, wireless access point 303, server 304, and database 305, interconnected as shown. As will be appreciated by those skilled in the art, in some embodiments wireless access point 303 might be replaced with a cellular (e.g., CDMA, GSM, etc.) base station and might be located several miles away from telecommunications system 300.

Mobile telecommunications terminal 202 wirelessly transmits signals to and receives signals from wireless access point 303 in well-known fashion. In addition, mobile telecommunications terminal 202 has one or more input mechanisms (e.g., keypad input, pen-based input, voice input, etc.) through which user 101 can enter commands (e.g., place a telephone call, access a webpage, access information in a database, etc.), as is well-known in the art. It will be clear to those skilled in the art, after reading this disclosure, how to make and use mobile telecommunications terminal 202.

Wireless access point 303 wirelessly transmits signals to and receives signals from mobile telecommunications terminal 202, and possibly other mobile telecommunications terminals, in well-known fashion. As will be appreciated by those skilled in the art, in some embodiments wireless access point 303 might operate in accordance with a local-area network protocol (e.g., IEEE 802.11 ["Wi-Fi"], etc.), while in some embodiments wireless access point 303 might operate in accordance with a metropolitan-area network protocol (e.g., IEEE 802.16 ["Wi-Max"], etc.). It will be clear to those skilled in the art, after reading this disclosure, how to make and use wireless access point 303.

Server 304 is a computer that receives requests from client devices and performs one or more computing tasks in response to these requests, as is well-known in the art. As shown in FIG. 3, server 304 sends signals to and receives signals from (i) wireless access point 303 via wired connection 306, and (ii) database 305 via wired connection 307, in well-known fashion. It will be clear to those skilled in the art, after reading this disclosure, how to make and use server 304.

Database 305 stores information for a plurality of users, a plurality of commands, and a plurality of geographic perimeters (e.g., a room, a floor in a hospital, a circle with a radius of five feet centered at a particular medical apparatus, etc.), where the information indicates whether particular users are authorized to execute particular commands from particular geo-locations, and if so authorized, whether one or more products of a command should be suppressed or encoded, as described above. In addition, database 305 stores geometric information that defines a plurality of perimeters.

FIG. 4 depicts an exemplary organization of information in database 305 in accordance with the illustrative embodiment of the present invention. As shown in FIG. 4, database 305 comprises: command authorization table 401, content version table 402, rule list 403, and geometric information table 404.

Command authorization table 401 contains a list of allowed commands for various user/perimeter combinations; if a particular command/user/perimeter combination is not in command authorization table 401, then that combination is not allowed. (As will be appreciated by those skilled in the art, in some embodiments it might be advantageous to instead enumerate the non-permissible combinations in command authorization table 401.) Command authorization table 401 also indicates, when appropriate, whether any particular products of the command should be suppressed or encoded, as described above.

As shown in FIG. 4, some entries of command authorization table 401 are associated with a conditional rule in rule list 403. For commands that access the value associated with a descriptor (e.g., the value associated with descriptor "pulse" for a particular patient, etc.), rule list 403 might contain rules that determine authorization based on the particular value stored (e.g., pulse>=180, etc.), the descriptor itself, or both.

Content version table 402 indicates which version of content is accessible for particular content/user/perimeter combinations. For example, the first row of content version table 402 in FIG. 4 indicates that when user MajJSmith accesses content F16MaxSpeed, he gets the classified version when inside perimeter FortMonmouth and the unclassified version when outside perimeter FortMonmouth.

Geometric information table 404 defines the perimeters referenced in command authorization table 401 and content version table 402. As shown in FIG. 4, a perimeter might be a polygon defined by an ordered list of vertices, a circle defined by its center and radius, etc. As will be appreciated by those skilled in the art, a perimeter associated with a particular entry in command authorization table 401 or content version table 402 might represent a particular room with limited access, an area in which a computer that stores the pertinent content is located, etc.

As will be appreciated by those skilled in the art, in some embodiments database 305 might also include information that classifies users into groups (e.g., nurses, doctors, etc.) and might encode authorization information in database 305 with respect to these groups as well as with respect to individual users. As will also be appreciated by those skilled in the art, in some embodiments database 305 might reside in a database server that is separate from server 304, while in some other embodiments database 305 might be stored in server 304 itself; furthermore, in the second illustrative embodiment of the present invention, described below, some or all of the authorization and geometric information of database 305 is instead stored in mobile telecommunications terminal 202. It will be clear to those skilled in the art, after reading this disclosure, how to make and use database 305.

Figure 5:
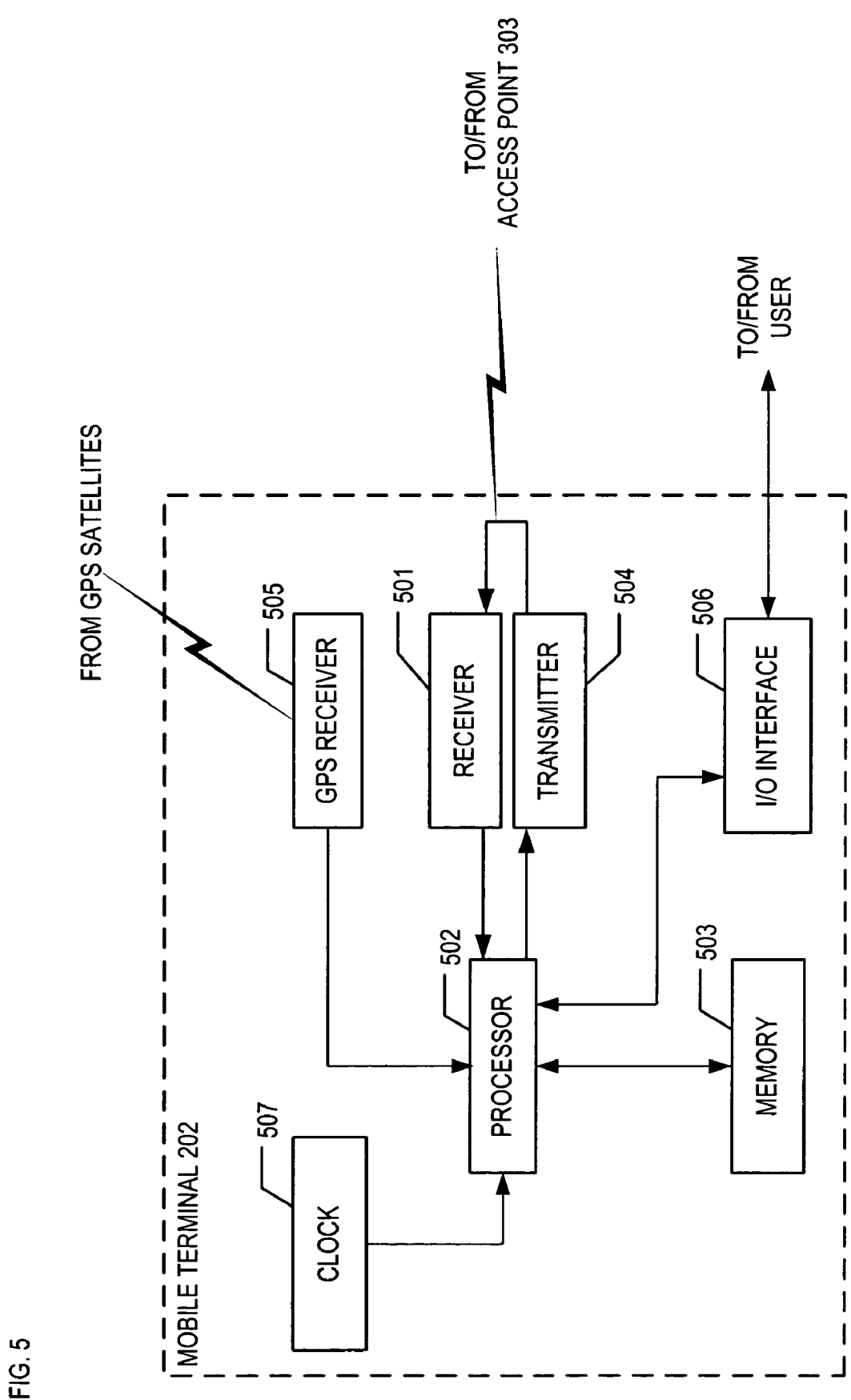
FIG. 5 depicts a block diagram of the salient components of mobile telecommunications terminal 202, as shown in FIGS. 2 and 3, in accordance with the illustrative embodiment of the present invention.

FIG. 5 depicts a block diagram of the salient components of mobile telecommunications terminal 202 in accordance with the illustrative embodiment of the present invention. As shown in FIG. 5, mobile telecommunications terminal 202 comprises receiver 501, processor 502, memory 503, transmitter 504, GPS receiver 505, input/output interface 506, and clock 507, interconnected as shown.

Receiver 501 receives signals wirelessly from wireless access point 303 and forwards the information encoded in these signals to processor 502, in well-known fashion. It will be clear to those skilled in the art, after reading this disclosure, how to make and use receiver 501.

Processor 502 is a general-purpose processor that is capable of executing instructions stored in memory 503, of reading data from and writing data into memory 503, and of executing the tasks described below and with respect to FIGS. 8 through 11. In some alternative embodiments of the present invention, processor 202 might be a special-purpose processor. In either case, it will be clear to those skilled in the art, after reading this disclosure, how to make and use processor 502.

Memory 503 stores data and executable instructions, as is well-known in the art, and might be any combination of random-access memory (RAM), flash memory, disk drive, etc. It will be clear to those skilled in the art, after reading this disclosure, how to make and use memory 503.

Transmitter 504 receives information from processor 502 and wirelessly transmits signals that encode this information to wireless access point 303, in well-known fashion. It will be clear to those skilled in the art, after reading this disclosure, how to make and use transmitter 504.

Global Positioning System (GPS) receiver 505 receives satellite-based signals and determines geo-location, as is well understood in the art, and forwards the geo-location to processor 420. It will be clear to those skilled in the art that some embodiments might employ means other than satellite-based signals for determining geo-location (e.g., triangulation, radio beacons, radio-frequency fingerprinting [U.S. Pat. No. 6,393,294, incorporated by reference], etc.) In such embodiments, an appropriate receiver (e.g., radio-frequency receiver, etc.) would be substituted for GPS receiver 505, as is well understood in the art.

Input/output interface 506 (i) receives input signals from the user of mobile telecommunications terminal 202 and forwards corresponding signals to processor 502, and (ii) receives signals from processor 502 and emits corresponding output signals that can be sensed by the user, in well-known fashion. As will be appreciated by those skilled in the art, the input mechanism of input/output interface 506 might be a keypad, touchscreen, microphone, etc., and the output mechanism of input/output interface 506 might be a liquid-crystal display (LCD), speaker, etc.

Clock 507 transmits the current time, date, and day of the week to processor 502 in well-known fashion.

Figure 6:
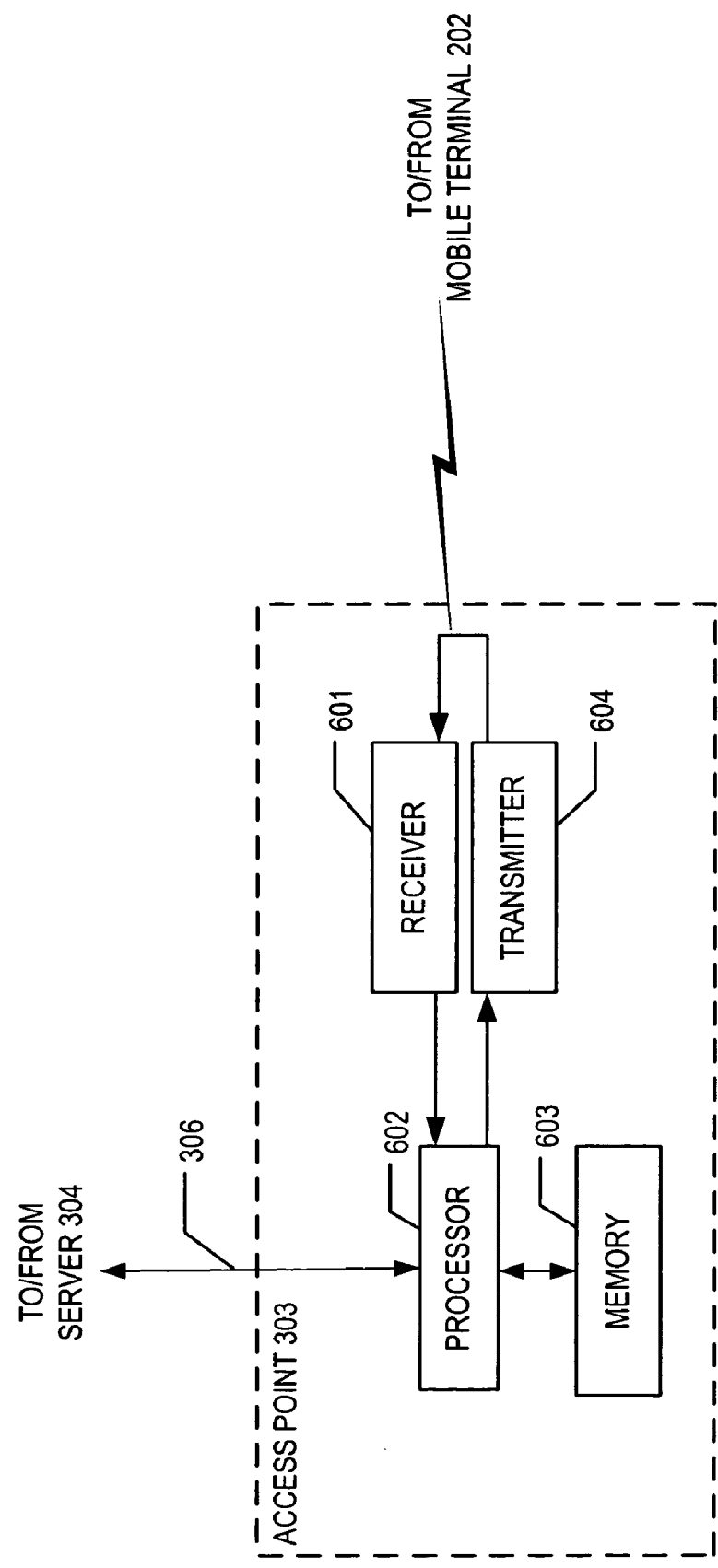
FIG. 6 depicts a block diagram of the salient components of wireless access point 303, as shown in FIG. 3, in accordance with the illustrative embodiment of the present invention.

FIG. 6 depicts a block diagram of the salient components of wireless access point 303 in accordance with the illustrative embodiment of the present invention. As shown in FIG. 6, wireless access point 303 comprises receiver 601, processor 602, memory 603, and transmitter 604, interconnected as shown.

Receiver 601 receives signals wirelessly from mobile telecommunications terminal 202, and possibly other mobile telecommunications terminals, and forwards the information encoded in these signals to processor 602, in well-known fashion. It will be clear to those skilled in the art, after reading this disclosure, how to make and use receiver 601.

Processor 602 is a general-purpose processor that is capable of executing instructions stored in memory 603, of reading data from and writing data into memory 603, of forwarding information received from mobile telecommunications terminal 202 to server 304, of receiving information from server 304, and of executing the tasks described below and with respect to FIGS. 9 and 11. In some alternative embodiments of the present invention, processor 602 might be a special-purpose processor. In either case, it will be clear to those skilled in the art, after reading this disclosure, how to make and use processor 602.

Memory 603 stores data and executable instructions, as is well-known in the art, and might be any combination of random-access memory (RAM), flash memory, disk drive, etc. It will be clear to those skilled in the art, after reading this disclosure, how to make and use memory 603.

Transmitter 604 receives information from processor 602 and wirelessly transmits signals that encode this information to mobile telecommunications terminal 202, in well-known fashion. It will be clear to those skilled in the art, after reading this disclosure, how to make and use transmitter 604.

Figure 7:
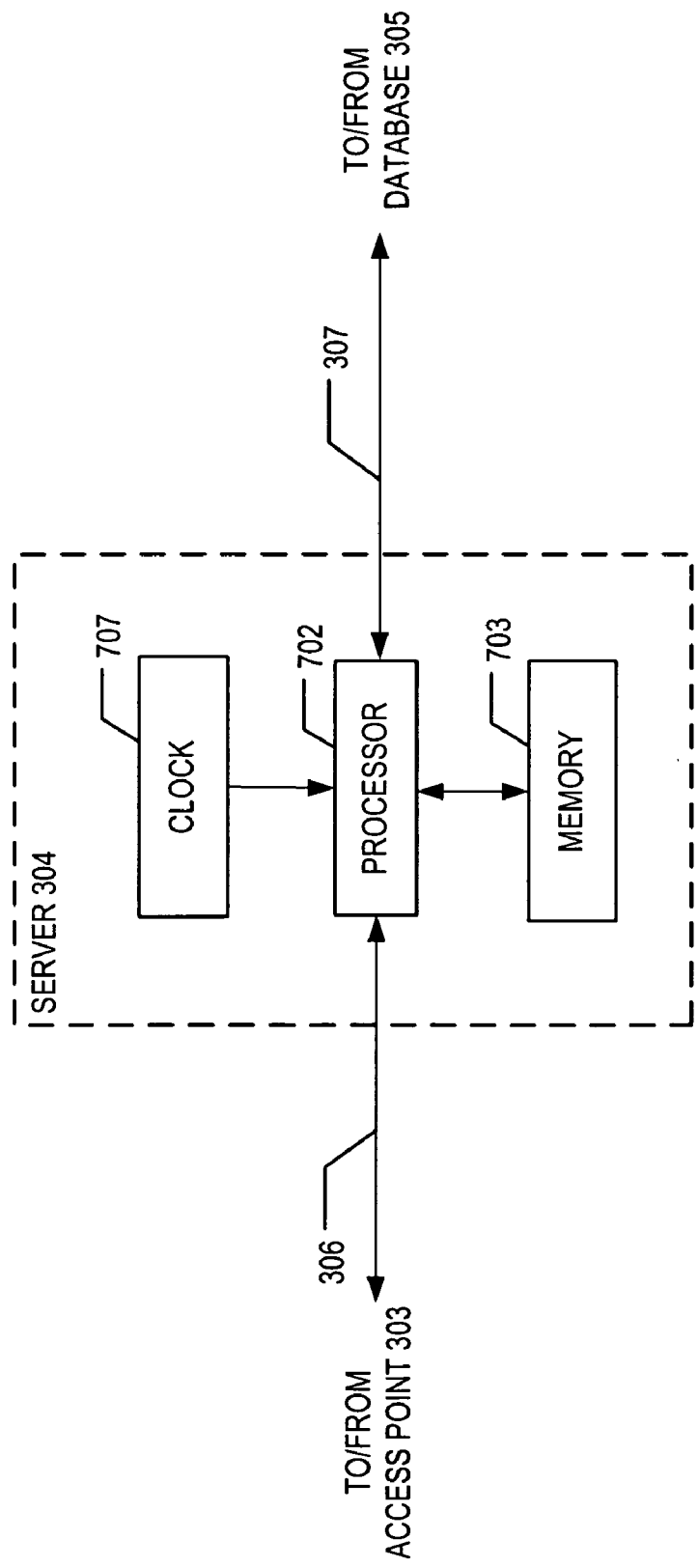
FIG. 7 depicts a block diagram of the salient components of server 304, as shown in FIG. 3, in accordance with the illustrative embodiment of the present invention.

FIG. 7 depicts a block diagram of the salient components of server 304 in accordance with the illustrative embodiment of the present invention. As shown in FIG. 7, server 304 comprises processor 702 memory 703, and clock 707, interconnected as shown.

Processor 702 is a general-purpose processor that is capable of executing instructions stored in memory 703, of reading data from and writing data into memory 703, of transferring information to and from wireless access point 303, and of executing the tasks described below and with respect to FIGS. 9 and 11. In some alternative embodiments of the present invention, processor 702 might be a special-purpose processor. In either case, it will be clear to those skilled in the art, after reading this disclosure, how to make and use processor 702.

Memory 703 stores data and executable instructions, as is well-known in the art, and might be any combination of random-access memory (RAM), flash memory, disk drive, etc. It will be clear to those skilled in the art, after reading this disclosure, how to make and use memory 703.

Clock 707 transmits the current time, date, and day of the week to processor 702 in well-known fashion.

Figure 8:
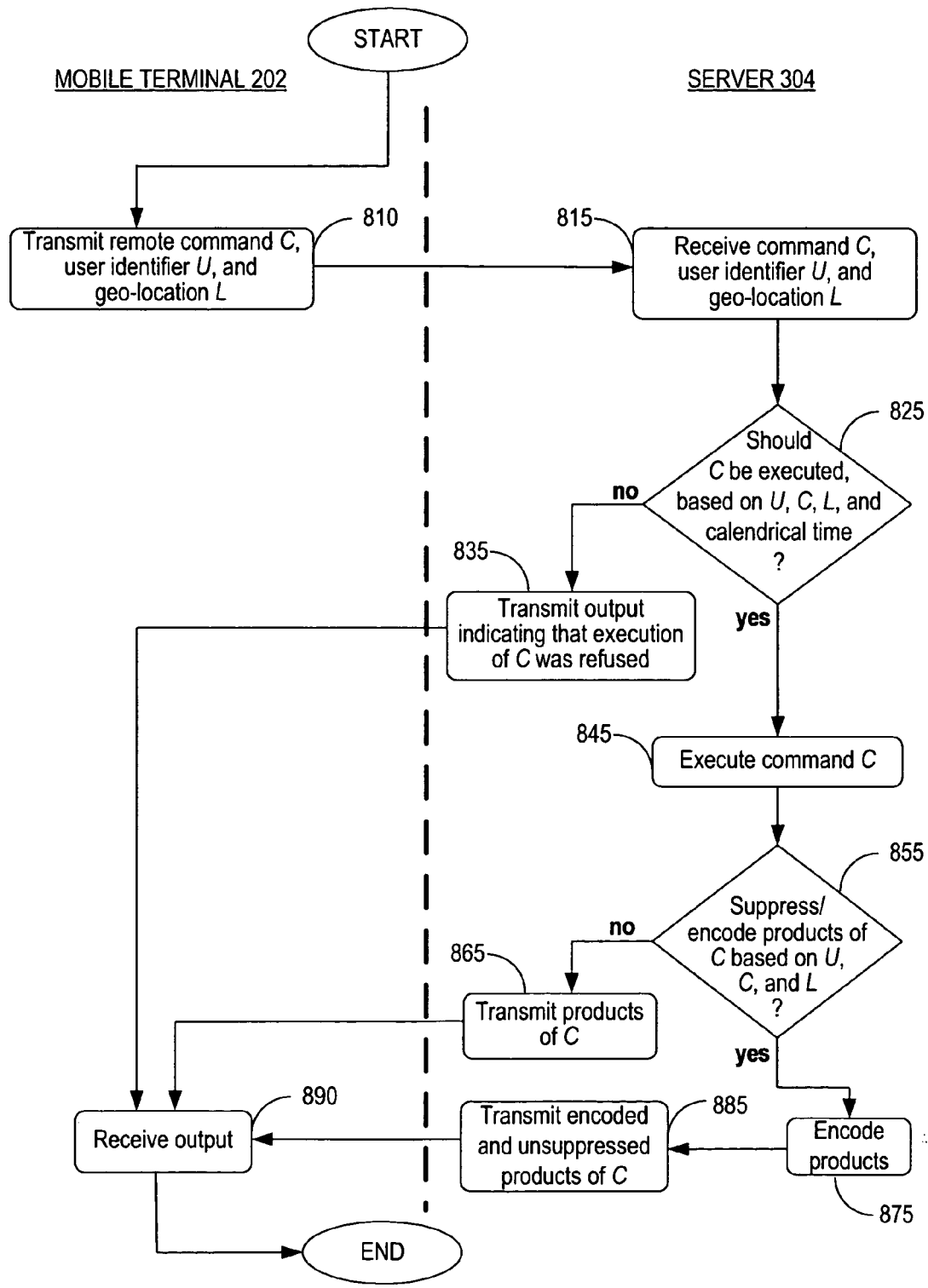
FIG. 8 depicts the operation of mobile telecommunications terminal 202 and server 304 in response to a remote command input at mobile telecommunications terminal 202, in accordance with the illustrative embodiment of the present invention.

FIG. 8 depicts the operation of mobile telecommunications terminal 202 and server 304 in response to a remote command input at mobile telecommunications terminal 202, in accordance with the illustrative embodiment of the present invention. It will be clear to those skilled in the art which tasks depicted in FIG. 8 can be performed simultaneously or in a different order than that depicted.

At task 810, mobile telecommunications terminal 202 transmits to server 304, via wireless access point 303: (i) a remote command C that was input by the user of mobile telecommunications terminal 202, (ii) an identifier U that indicates the user of mobile telecommunications terminal 202 (e.g., a username, etc.), and (iii) the geo-location L of mobile telecommunications terminal 202, in well-known fashion. In some embodiments in which mobile telecommunications terminal 202 is used by a single user only, the identifier might indicate the terminal itself, while in embodiments in which different users might use mobile telecommunications terminal 202, the user could identify himself or herself by initially "logging in" to the terminal.

At task 815, server 304 receives, via wireless access point 303, remote command C, identifier U, and geo-location L, in well-known fashion.

At task 825, server 304 determines whether to execute remote command C based on geo-location L, identifier U, remote command C, and, if necessary, calendrical time. In particular, processor 702 consults database 305 and determines, based on the contents of command authorization table 401, rule list 403, and geometric information table 404, whether the command should be executed. This determination involves identifying the pertinent table rows and rules, which, as will be appreciated by those skilled in the art, can be performed in a variety of ways, and then applying this information accordingly. If processor 702 determines that remote command C should not be executed, the method of FIG. 8 continues at task 835; otherwise the method of FIG. 8 proceeds to task 845.

At task 835, server 304 transmits to mobile telecommunications terminal 202, via wireless access point 303, an output that indicates that the execution of remote command C was refused. After completion of task 835, the method of FIG. 8 continues at task 890.

At task 845, processor 702 of server 304 executes remote command C, in well-known fashion.

At task 855, server 304 determines whether to suppress or encode any products of remote command C based on geo-location L, identifier U, remote command C, and, if specified by an appropriate rule in rule list 403, calendrical time. Processor 702 performs task 855 based on the pertinent table row(s) and rule(s) of database 305, as in task 835. If processor 702 determines that no products should be suppressed or encoded, the method of FIG. 8 continues at task 865; otherwise the method of FIG. 8 proceeds to task 875.

At task 865, server 304 transmits to mobile telecommunications terminal 202, via wireless access point 303, the products of remote command C, in well-known fashion. After completion of task 835, the method of FIG. 8 continues at task 890.

At task 875, processor 702 of server 304 encodes the appropriate products of remote command C, in well-known fashion. After completion of task 875, the method of FIG. 8 continues at task 885.

At task 885, server 304 transmits to mobile telecommunications terminal 202, via wireless access point 303, unsuppressed products of remote command C (both encoded and un-encoded), in well-known fashion. After completion of task 885, the method of FIG. 8 continues at task 890.

At task 890, mobile telecommunications terminal 202 receives, via wireless access point 303, output from server 304, in well-known fashion. After task 890 the method of FIG. 8 terminates.

Figure 9:
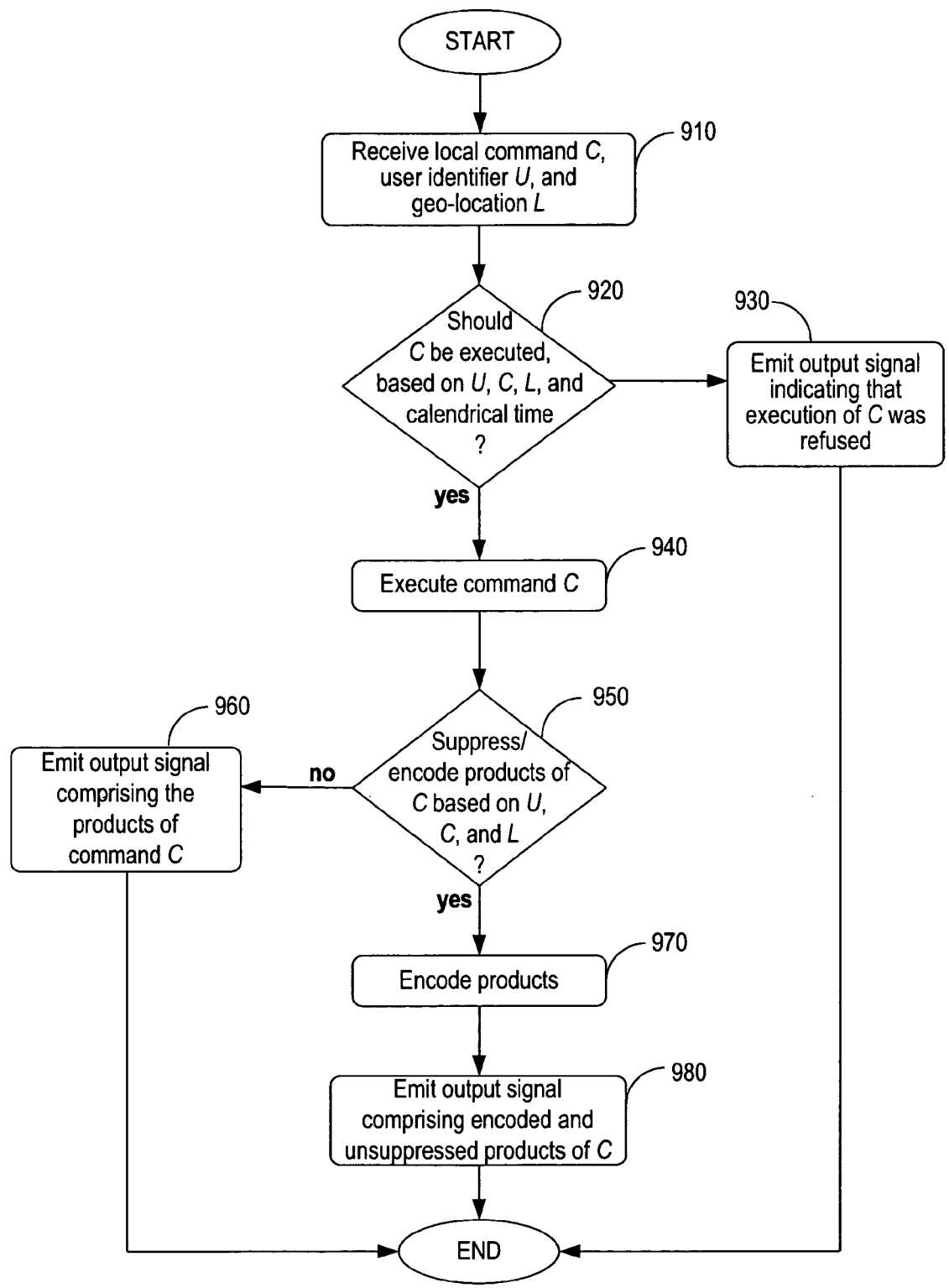
FIG. 9 depicts the operation of mobile telecommunications terminal 202 in response to a local command input at mobile telecommunications terminal 202, in accordance with the illustrative embodiment of the present invention.

FIG. 9 depicts the operation of mobile telecommunications terminal 202 in response to a local command input at mobile telecommunications terminal 202, in accordance with the illustrative embodiment of the present invention. It will be clear to those skilled in the art which tasks depicted in FIG. 9 can be performed simultaneously or in a different order than that depicted.

At task 910, processor 502 of mobile telecommunications terminal 202 receives, in well-known fashion, (i) an identifier U that indicates the user of mobile telecommunications terminal 202 (e.g., a username, etc.); (ii) a local command C from the user via input/output interface 506; and (iii) the geo-location L of mobile telecommunications terminal 202 via GPS receiver 505.

At task 920, mobile telecommunications terminal 202 determines whether to execute local command C based on geo-location L, identifier U, local command C, and, if necessary, calendrical time. In particular, processor 502 consults data stored in memory 503 (i.e., corresponding versions of command authorization table 401, rule list 403, and geometric information table 404 in database 305 of the first illustrative embodiment) and determines, based on the contents of memory 503, whether the command should be executed, as in task 825 of the first illustrative embodiment. If processor 502 determines that local command C should not be executed, the method of FIG. 9 continues at task 930; otherwise the method of FIG. 9 proceeds to task 950.

At task 930, mobile telecommunications terminal 202 emits, via input/output interface 506, an output signal (e.g., text message, audible sound, etc.) that indicates that the execution of local command C was refused. After completion of task 930, the method of FIG. 9 terminates.

At task 950, processor 502 of mobile telecommunications terminal 202 executes local command C, in well-known fashion.

At task 960, server 304 determines whether to suppress or encode any products of local command C based on geo-location L, identifier U, command C, and, if necessary, calendrical time. Processor 502 performs task 960 based on the pertinent table row(s) and rule(s) of memory 503, as in task 920. If processor 502 determines that no products should be suppressed or encoded, the method of FIG. 9 continues at task 960; otherwise the method of FIG. 9 proceeds to task 970.

At task 960, mobile telecommunications terminal 202 emits, via input/output interface 506, the products of local command C, in well-known fashion. After completion of task 960, the method of FIG. 9 terminates.

At task 970, processor 502 of mobile telecommunications terminal 202 encodes the appropriate products of local command C, in well-known fashion. After completion of task 970, the method of FIG. 9 continues at task 980.

At task 980, mobile telecommunications terminal 202 emits, via input/output interface 506, an output signal comprising the unsuppressed products of local command C (both encoded and un-encoded), in well-known fashion. After task 980 the method of FIG. 9 terminates.

Figure 10:
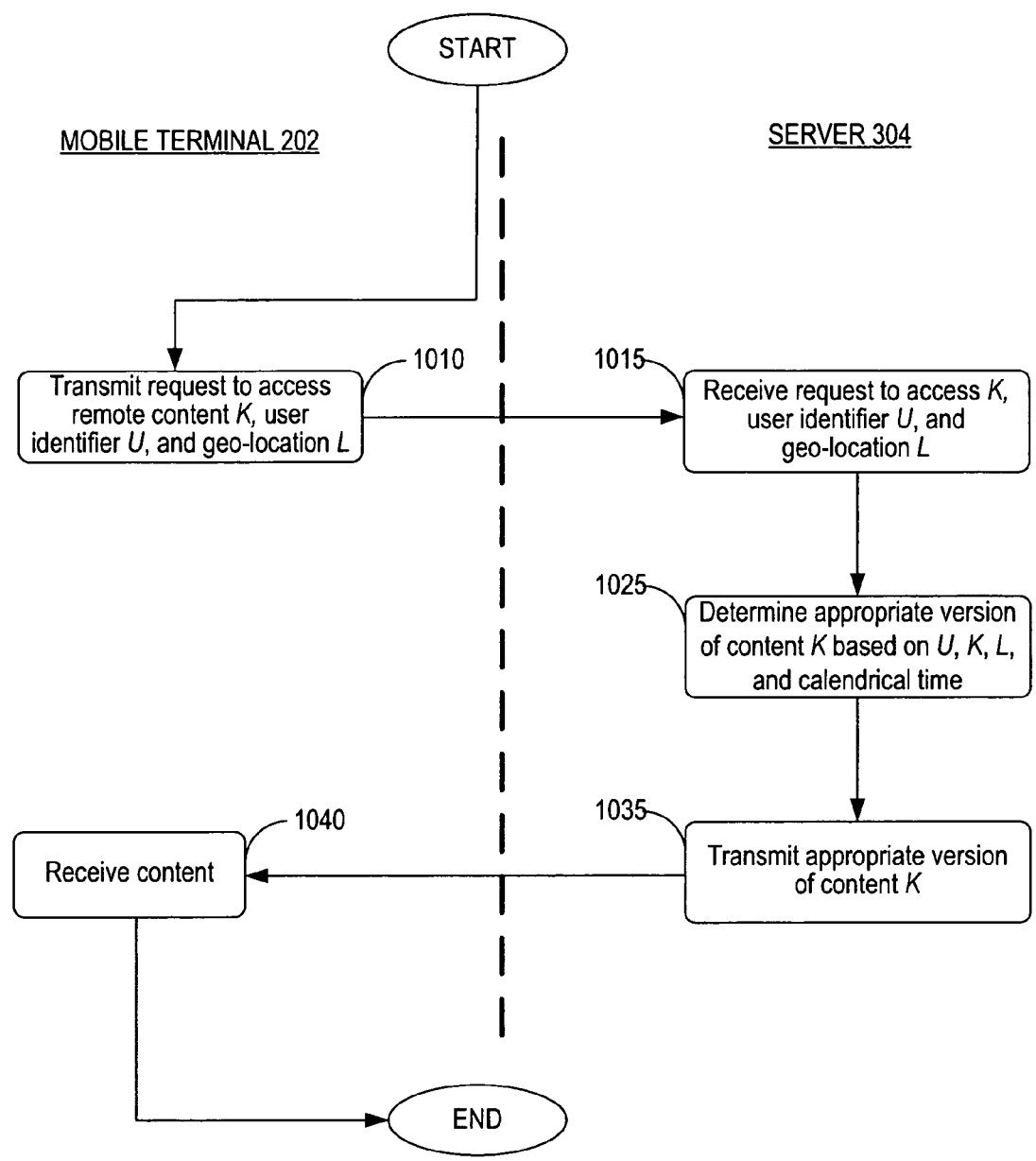
FIG. 10 depicts the operation of mobile telecommunications terminal 202 and server 304 in response to a request to access remote content at mobile telecommunications terminal 202, in accordance with the illustrative embodiment of the present invention.

FIG. 10 depicts the operation of mobile telecommunications terminal 202 and server 304 in response to a request to access remote content at mobile telecommunications terminal 202, in accordance with the illustrative embodiment of the present invention. It will be clear to those skilled in the art which tasks depicted in FIG. 10 can be performed simultaneously or in a different order than that depicted.

At task 1010, mobile telecommunications terminal 202 transmits to server 304, via wireless access point 303: (i) a request to access remote content K that was input by the user of mobile telecommunications terminal 202, (ii) an identifier U that indicates the user of mobile telecommunications terminal 202 (e.g., a username, etc.), and (iii) the geo-location L of mobile telecommunications terminal 202, in well-known fashion. In some embodiments in which mobile telecommunications terminal 202 is used by a single user only, the identifier might indicate the terminal itself, while in embodiments in which different users might use mobile telecommunications terminal 202, the user could identify himself or herself by initially "logging in" to the terminal.

At task 1015, server 304 receives, via wireless access point 303, the request to access remote content K, identifier U, and geo-location L, in well-known fashion.

At task 1025, server 304 determines the appropriate version of content K accessible to user U at geo-location L based on content version table 402, rule list 403, geometric information table 404, and, if necessary, calendrical time, in a manner similar to task 825 above.

At task 1035, processor 702 of server 304 retrieves the appropriate version of content K (e.g., from database 305, from memory 703, etc.) and transmits, via wireless access point 303, this content to mobile telecommunications terminal 202 in well-known fashion. After completion of task 1035, the method of FIG. 10 continues at task 1050.

At task 1050, mobile telecommunications terminal 202 receives, via wireless access point 303, content from server 304 in well-known fashion. After task 1050 the method of FIG. 10 terminates.

Figure 11:
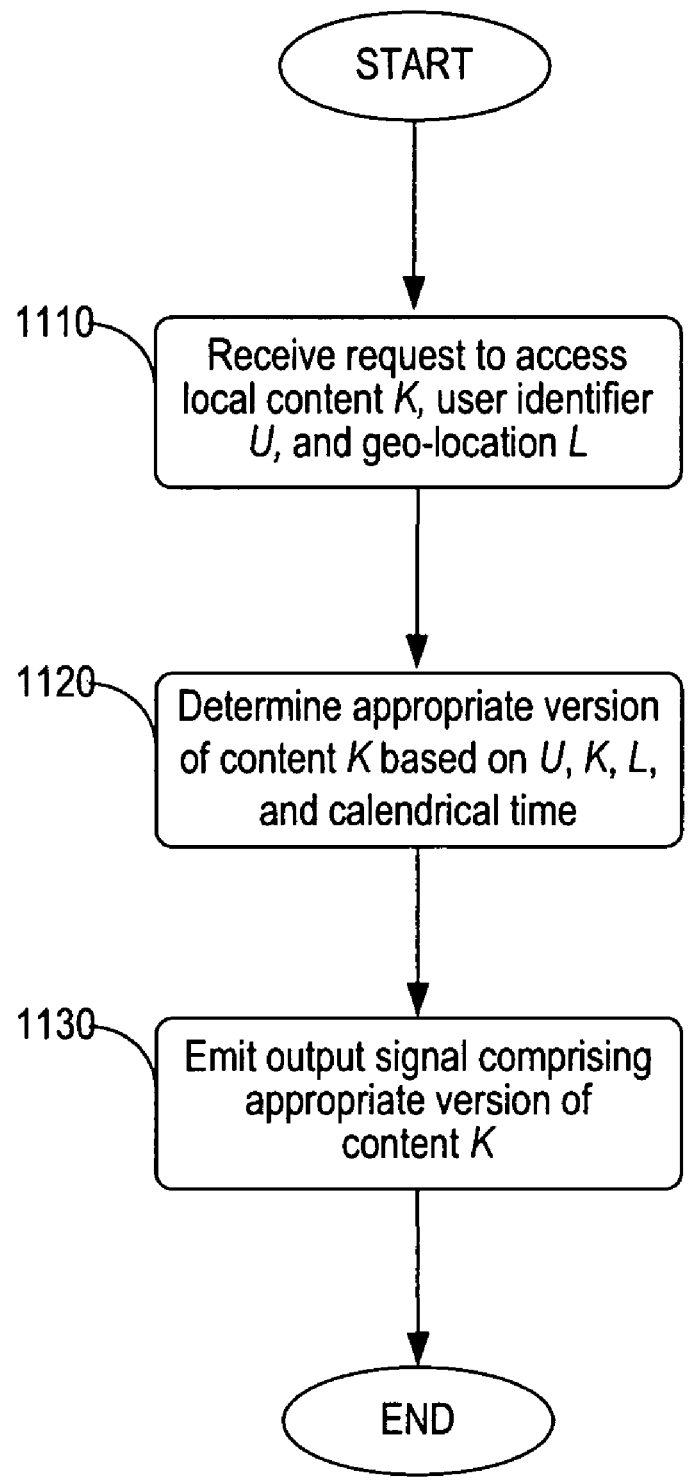
FIG. 11 depicts the operation of mobile telecommunications terminal 202 in response to a request to access local content at mobile telecommunications terminal 202, in accordance with the illustrative embodiment of the present invention.

FIG. 11 depicts the operation of mobile telecommunications terminal 202 in response to a request to access local content at mobile telecommunications terminal 202, in accordance with the illustrative embodiment of the present invention, in which the alternative version(s) of the content is (are) also stored locally at mobile telecommunications terminal 202. It will be clear to those skilled in the art which tasks depicted in FIG. 11 can be performed simultaneously or in a different order than that depicted.

At task 1110, processor 502 of mobile telecommunications terminal 202 receives, in well-known fashion, (i) an identifier U that indicates the user of mobile telecommunications terminal 202 (e.g., a username, etc.); (ii) a local request from the user, via input/output interface 506, to access content K; and (iii) the geo-location L of mobile telecommunications terminal 202 via GPS receiver 505.

At task 1120, mobile telecommunications terminal 202 determines the appropriate version of content K accessible to user U at geo-location L. In particular, processor 502 consults data stored in memory 503 (i.e., corresponding versions of content version table 402 and geometric information table 404 in database 305 of the first illustrative embodiment), retrieves the calendrical time from clock 506 if necessary, and determines the appropriate version of content K in a manner similar to task 1025 above.

At task 1130, mobile telecommunications terminal 202 emits, via input/output interface 506, an output signal comprising the appropriate content, in well-known fashion. After task 1130 the method of FIG. 11 terminates.

It is to be understood that the above-described embodiments are merely illustrative of the present invention and that many variations of the above-described embodiments can be devised by those skilled in the art without departing from the scope of the invention. It is therefore intended that such variations be included within the scope of the following claims and their equivalents.

What is claimed is:

1. A method comprising:
   receiving a user input at a mobile telecommunications terminal, wherein said user input is for executing a command that reads the value of a datum that is stored at a remote database; and
   determining whether to execute said command based on the geo-location of said mobile telecommunications terminal, an argument of said command, and the value of said datum stored at said remote database.

2. The method of claim 1 wherein the determination whether to execute said command is also based on the identity of the user of said mobile telecommunications terminal.

3. The method of claim 1 wherein the determination whether to execute said command is also based on the calendrical time at said mobile telecommunications terminal.

4. The method of claim 1 wherein the determination whether to execute said command is also based on the geo-location of the remote database at which said value is stored.

5. The method of claim 1 wherein the determination whether to execute said command is also based on what said datum represents.

6. A method comprising:
   receiving a user input at a mobile telecommunications terminal, wherein said user input is for requesting access to content that is stored at a remote database; and
   determining a version of said content to access from said remote database based on the geo-location of said mobile telecommunications terminal.

7. The method of claim 6 wherein the determination of said version of said content is also based on the identity of the user of said mobile telecommunications terminal.

8. The method of claim 6 wherein the determination of said version of said content is also based on the calendrical time at said mobile telecommunications terminal.

9. The method of claim 6 wherein the determination of said version of said content comprises determining whether said geo-location of said mobile telecommunications terminal is inside a perimeter.

10. The method of claim 9 wherein said perimeter is based on the identity of the user of said mobile telecommunications terminal.

11. The method of claim 9 wherein said perimeter is based on said content.

12. The method of claim 9 wherein said perimeter is based on the geo-location of said remote database at which said value is stored.

13. The method of claim 6 wherein a first version of said content is associated with a first medium, and wherein a second version of said content is associated with a second medium.

14. The method of claim 6 wherein a first version of said content is associated with a first authorization category, and wherein a second version of said content is associated with a second authorization category.

15. A method comprising: transmitting from a mobile telecommunications terminal a request to access remote content that is stored at a remote database; and
   receiving at said mobile telecommunications terminal from said remote database a version of said remote content that is based on the geo-location of said mobile telecommunications terminal.

16. The method of claim 15 wherein said version of said remote content is also based on the identity of the user of said mobile telecommunications terminal.

17. The method of claim 15 wherein said version of said remote content is also based on the calendrical time at said mobile telecommunications terminal.

18. The method of claim 15 wherein said version of said remote content is based on whether said geo-location of said mobile telecommunications terminal is inside a perimeter.

19. The method of claim 18 wherein said perimeter is based on the identity of the user of said mobile telecommunications terminal.

20. The method of claim 18 wherein said perimeter is based on said content.

21. The method of claim 18 wherein said perimeter is based on the geo-location of said remote database at which said remote content is stored.

22. The method of claim 15 wherein a first version of said remote content is associated with a first medium, and wherein a second version of said remote content is associated with a second medium.

23. The method of claim 15 wherein a first version of said remote content is associated with a first authorization category, and wherein a second version of said remote content is associated with a second authorization category.

24. A method comprising:
receiving a user input at a mobile telecommunications terminal, wherein said user input is for executing a command that updates the value of a datum that is stored at a remote database; and
determining whether to execute said command based on the geo-location of said mobile telecommunications terminal, an argument of said command, and the value of said datum stored at said remote database said value prior to updating.

25. The method of claim 24 wherein the determination whether to execute said command is also based on the identity of the user of said mobile telecommunications terminal.

26. The method of claim 24 wherein the determination whether to execute said command is also based on the calendrical time at said mobile telecommunications terminal.

27. The method of claim 24 wherein the determination whether to execute said command is also based on what the value of said datum stored at said remote database said value would be after updating.

28. The method of claim 24 wherein the determination whether to execute said command is also based on the geo-location of said remote database at which said value is stored.

29. The method of claim 24 wherein the determination whether to execute said command is also based on what said datum represents.

30. A method comprising:
receiving a user input at a mobile telecommunications terminal, wherein said user input is for executing a command that reads the value of a remote datum that is stored at a remote database; and
determining whether to execute said command based on the geo-location of said mobile telecommunications terminal, an argument of said command, and the geo-location of said remote database at which said value is stored.

31. The method of claim 30 wherein the determination whether to execute said command is also based on the identity of the user of said mobile telecommunications terminal.

32. The method of claim 30 wherein the determination whether to execute said command is also based on the calendrical time at said mobile telecommunications terminal.

\* \* \* \* \*